June 2, 1931.  S. G. PLUMMER  1,808,066
SWIVEL JOINT FOR PIPES
Filed Sept. 10, 1929   2 Sheets-Sheet 1
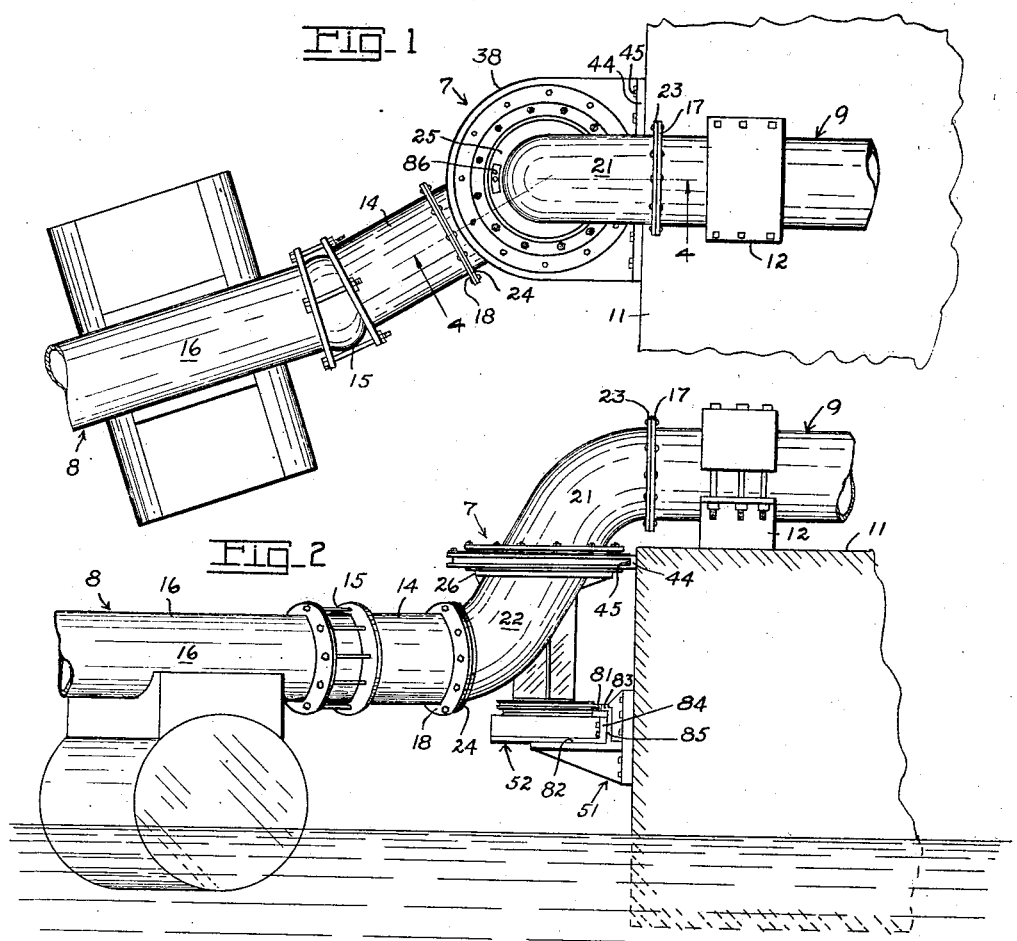
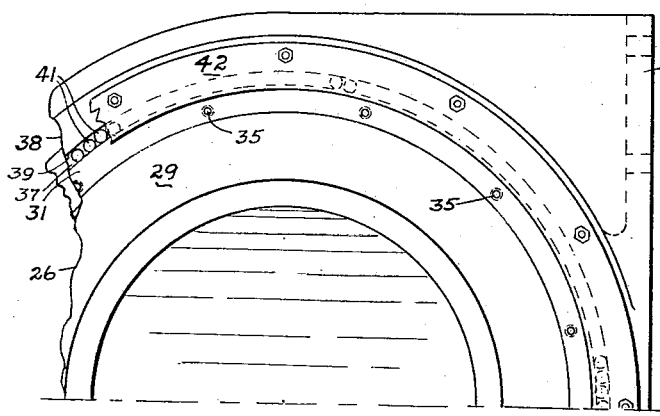
INVENTOR.
Sidney G. Plummer
BY M. C. Frank
ATTORNEY.

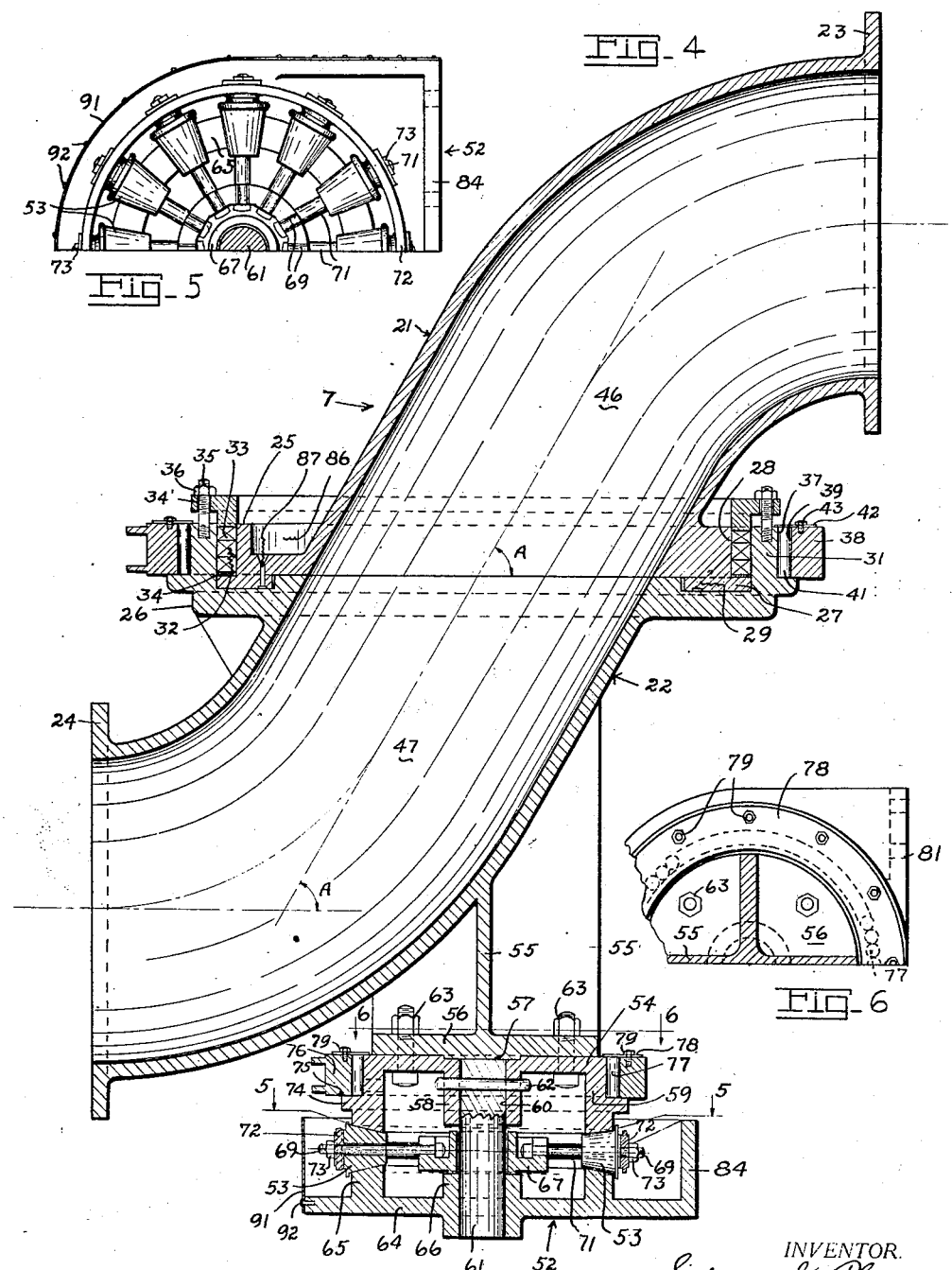

Patented June 2, 1931

1,808,066

UNITED STATES PATENT OFFICE

SIDNEY G. PLUMMER, OF OAKLAND, CALIFORNIA

SWIVEL JOINT FOR PIPES

Application filed September 10, 1929. Serial No. 391,559.

The invention relates to an improvement in swivel joints particularly designed for use in connecting large pipes.

An object of the invention is to provide a swivel joint for pipes in which the pipe elements at the joint are arranged to be supported in place independently of each other whereby weight strains are avoided at the joint.

Another object of the invention is to provide a joint of the character described which is effectively sealed against the leakage of fluid therethrough.

A further and more specific object of the invention is to provide a swivel joint of the character described which is particularly adapted for use with a floating dredger pump for connecting a relatively movable intake or discharge pipe to the pump.

An added object of the invention is to bring about a new combination and corelation of parts in a device of the class described whereby marked economies in manufacture will be effected and the life and efficiency of the device will be enhanced.

The invention possesses other objects and features of advantage, some of which, with the foregoing, will be set forth or be apparent in the following description of a preferred form of the invention which is illustrated in the accompanying drawings, in which:

Figure 1 is a plan view showing the joint in use for connecting a pontoon-supported pipe line with a pipe on a dredger barge.

Figure 2 is a side elevation of the installation shown in Figure 1.

Figure 3 is an enlarged fragmentary plan view of the upper end of a lower joint member and a centering ring therefor.

Figure 4 is an enlarged vertical axial section through the elements of the joint, said section being taken on the broken line 4—4 in Figure 1.

Figure 5 is a fragmentary section at 5—5 in Figure 4.

Figure 6 is a fragmentary plan view taken generally at 6—6 in Figure 4.

By way of illustration, a swivel pipe joint 7 embodying the invention is shown in use for connecting a pontoon-supported pipe line 8 with the discharge pipe 9 of a floating hydraulic dredger 11, the latter being shown only in fragmentary outline. The pipe 9 is seen to be fixedly mounted on the dredger through being clamped to a saddle block 12 on the dredger with an end thereof adjacent an edge of the dredger. The end portion of the pipe line which is to be connected with the pipe 9 is seen to comprise a pipe 14 fixed to an adjacent pipe 16 by means of a flexible joint 15. The pipes 9 and 14 are in the present instance provided with end flanges 17 and 18 respectively for connection to the swivel joint 7 and are both subject to movement in planes parallel to the surface of the supporting water and at different levels with respect to said surface, with the flanges 17 and 18 defining vertical planes. To meet the foregoing relations of the pipes 9 and 14, which relations are seen to be usual ones, the joint 7 is of an offset type wherein the axial lines of intake and discharge to and from the joint are relatively movable in spaced parallel planes and about an axis perpendicular to said planes and intersecting said lines.

Referring now more specifically to the structure of the joint 7 wherein the present invention specifically resides, it is seen that said joint comprises cooperating upper and lower elbow members 21 and 22 respectively having flanged ends 23 and 24 for fixing to the pipe flanges 17 and 18. The abutting ends of the members 21 and 22 are provided with opposed annular and radial flanges 25 and 26 respectively which abut to define a plane parallel to the planes of relative movement of the before-mentioned axial lines of intake and discharge of the joint 7.

Means are provided for sealing the joint at the abutment of the flanges 25 and 26, said means being incorporated with the structures of said flanges. As particularly shown, the flange 25 is provided at its lower face with an integral annulus 27 which extends both axially from said face and radially outwardly of the peripheral flange face 28. The upper face of the flange 26 is provided with an annular groove 29 for the complementary reception of the annulus 27, and is further provided with an axially directed integral annulus 31 extending from the outer edge of said groove 29 to the top level of the flange 25. With the flanges 25 and 26 engaged as shown, an annular space 32 is seen to be defined opposite the peripheral face 28 of the flange 25, said space lying between said face and the inner face of the annulus 31 and above the radially protruding portion of the annulus 27. The space 32 is arranged to receive suitable packing 33, said packing being placed on top of a wear-ring 34 which is disposed in the bottom of the space. The side surfaces of the space 32 are machined and the packing 33 is preferably of an hydraulic type whereby a proper water seal is provided thereby. For compressing the packing 33 in the space 32, a gland ring 34' is mounted on the top of the annulus 31 for engagement with the top of the packing; as shown, the ring 34' is perforated to receive stud bolts 35 extending from said annulus and is held in compressive engagement with the packing by means of nuts 36 engaging said bolts. In this manner, the swivel joint is sealed and the axial separation of the members 21 and 22 is resisted by the packing.

Means are preferably provided for positively maintaining the flange 26 in axially aligned relation to the flange 25, and said means will now be described. The flange 26 is seen to extend beyond the outer peripheral face 37 of the annulus 31 thereof and a retainer ring 38 is coaxially disposed on said extending flange portion. The bore face 39 of the ring 38 and the face 37 are machined and bearing rollers 41 are mounted between said faces whereby the flange 26 is held for coaxial rotation within the ring 38. For retaining the rollers 41 in the race-way now described, a cover ring 42 is mounted on the retainer ring 38 to overlie the upper roller ends, cap screws 43 being engaged through the cover ring 42 and in the ring 38 for securing the former ring in its place. The ring 38 is provided at one side thereof with a base or foot 44 for fixedly securing it to the dredger 11, as by bolts 45. In this manner, since the member 21 is also fixedly related to the dredger, the ring 38 is held against upward displacement and at the same time positively maintains the flanges 25 and 26 in axially aligned relation at all times. Since, as noted, the member 21 is fixed, said member might obviously comprise an integral extension of the pipe 9 without departing from the spirit of the present invention.

It will now be noted that any angles provided in the passages 46 and 47 of the respective members 21 and 22 interfere with the flow of liquid therethrough and that such angles are therefore desirably of minimum size. Accordingly, and as particularly shown, the members 21 and 22 are in the form of substantially sixty degree elbows whereby to minimize the flow-losses thereat. With such a structure, the flow line through the swivel joint is seen to obliquely intersect the plane of engagement of the flanges 25 and 26 whereby, if the passages 46 and 47 were of circular section thereat, their bores would not always register as the member 22 is shifted about. Accordingly, it is preferred that the passages 46 and 47 be properly elliptical in transverse cross section adjacent their registering ends whereby they are of like size and circular in their plane of abutment, said plane coinciding, of course, with the plane of abutment of the flanges 25 and 26. In this manner, a relative rotation of the members 21 and 22 about the common axis of their flanges does not alter the effective size of the passage jointly provided by the members. Another advantage of the use of the aforesaid elbow members lies in the fact that the upper elbow 21 need not extend beyond the dredger as far as if it were a ninety degree elbow similarly constructed as to the described swivel joint feature. The aforesaid provision for the use of swivel joint elbow members having angles of less than ninety degrees is seen as an important element of the present invention.

It will now be noted that the swivel joint provided between the members 21 and 22 lacks any effective anti-friction bearing means between the flanges 25 and 26 whereby it is necessary that the member 22 be pivotally supported in its place independently of the member 21, and such a mounting is accordingly provided. Essentially, and as shown, the mounting provided for the member 22 comprises a bracket 51 for fixing to the dredger, a base 52 carried by the bracket, roller bearings 53 mounted on said base, and a member 54 fixed to the member 22 and carried on said roller bearings whereby the member 22 is arranged for supported rotation about the swivelling axis of the joint for permitting the disposal of the member 22 in various angular relations to the pipe 9 on the dredger, it being clear that the aforesaid axis is that of the annular flanges 25 and 26.

Intersecting webs 55 depend from the under side of the member 22 to a base plate 56 which is parallel to the plane of abutment of the members 21 and 22. A cylindrical integral boss 57 extends downwardly from the plate 56, the axis of said boss coinciding with the aforesaid swivel axis. The member 54 is seen to comprise a circular plate having a central and depending boss 58 and a depending annulus 59 at its rim. The boss 58 is provided with a bore 60 in which is fixed a depending stub shaft 61 as by a pin 62. It will now be noted that the base plate 56 is arranged to seat on and be held to the member 54, and for this purpose the bore 60 is counterbored from above whereby to receive the boss 57 in fitted engagement while the remaining opposed surfaces of the plate 56 and member 54 engage. In this manner, the member 54 is arranged for mounting in axially centered relation to the swivel axis of the member 22, bolts 63 being engaged through the member 54 and plate 56 for fixing these elements together in said centered relation.

The base 52 is seen to comprise a plate 64 having an upwardly extending integral annulus 65 of the same circumferential size as the annulus 59 of the member 54. A boss 66 extends upwardly from the plate 64 in coaxial relation to the annulus 65 and said latter boss is axially perforated to provide a bore for the rotatable reception of the shaft 61 whereby the axial alignment of the annuli 59 and 65 is provided for. The roller bearings 53 are seen to be axially perforated and are carried by a spider frame which includes a central body portion 67 centrally perforated to rotatably receive the shaft 61 and mounted on said shaft between the bosses 58 and 66 in supported engagement with the latter. The spider arms are seen to comprise shaft bolts 69 extending radially from the body and having the rollers 53 mounted on the outer ends thereof. The rollers are held in operative position on the shaft bolts 69 between spacing sleeves 71 mounted on the bolts 69 and a spacing ring 72 through which the outer and threaded bolt extremities extend for receiving nuts 73.

It will now be noted that the rollers 53 and their mounting comprise a unitary anti-friction element and that the line of rollers is engaged between the opposed edges of the annuli 59 and 65 whereby the former is supported on the latter. The bearing edges of the annuli 59 and 65 are, of course, shaped in a complementary manner to the roller surfaces; in the present instance, the rollers are seen to be conically tapered inwardly thereof.

Means are preferably provided for positively securing the base 52 and member 54 against relative lateral displacement. As particularly shown, the annulus 59 of the member 54 is provided somewhat below its top with an outwardly extending radial flange 74 providing a supporting step 75. A retainer ring 76 is mounted on the step 75 in coaxial relation therewith and cylindrical bearing rollers 77 are engaged in vertical position in the space defined between the annulus 59 and ring 76, said space defining a raceway for the rollers, and the opposed surfaces of the annulus and ring being machined to provide bearing faces for the rollers. The retainer ring 76 carries thereon a cover ring 78 fixed thereto by means of cap screws 79 and extending inwardly to overlie the rollers 77 for retaining them in the aforesaid raceway. Means are provided on the ring 76 for fixing the same to the dredger, and as shown, such means comprises the formation of the ring to provide a tangentially directed base portion 81 whereby the ring may be fixedly secured to the dredger.

Referring now to the structure of the bracket 51, it is seen that said member provides a shelf 82 for receiving the bottom of the base 52 and an integral upper extension 83 to which the base portion 81 of the ring 76 is arranged to be bolted. Preferably, and as shown, the base member 52 is provided at its outer edge with a flange 84 extending transversely and tangentially therefrom, and the bracket is provided with an intermediate and upright web 85 against and to which the flange 84 is arranged to be bolted. In this manner, the members 52 and 54 are arranged to be secured in the required fixed relation, it being obvious, however, that the specific mounting means for these members is generally immaterial to the purposes of the present invention.

Means are preferably provided for lubricating the swivel joint and the rollers 53. As shown, the upper side of the flange 25 is formed to provide a cup 86 from which a duct 87 leads through the annulus 27 of the flange 25 for gravitationally delivering a fluid lubricant (not shown) to the groove 29 of the flange 26. A flange 91 extends upwardly from along the outer edges of the base 52 to a level above that of the rollers 53 to provide a well for a fluid lubricant (not shown) whereby the rollers may constantly operate in said lubricant. As shown, the flange 91 comprises a strip of sheet metal fixed to and around the free edges of the base plate 52 by means of cap screws 92.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a swivel fitting for connecting pipes, a pair of tubular elements having opposed ends thereof providing annular radial flanges engaged in coaxial and abutting relation for relative rotation about a fixed axis, and anti-friction means cooperative with one only of said flanges to maintain the same in coaxial alignment with the other flange.

2. In a swivel fitting for connecting pipes for relative rotation in a plane at an angle to their axis, a pair of tubular elements having opposed ends thereof providing annular radial flanges engaged in co-axial and abutting relation for relative rotation about a fixed axis, packing means between said flanges and anti-friction means cooperative with one of said flanges to maintain the same in co-axial alignment with the other flange.

3. A swivel connection between a fixed conduit and a movable conduit comprising an outwardly and upwardly extending flange on the fixed conduit, an outwardly and upwardly extending flange on the movable conduit to surround said first named flange, a shoulder on the outer periphery of said second flange, anti-friction means supported by said shoulder, and a retaining ring surrounding said anti-friction means and fixed with relation to the fixed conduit.

4. A swivel connection between a fixed conduit and a movable conduit comprising an outwardly and upwardly extending flange on the fixed conduit, an outwardly and upwardly extending flange on the movable conduit to surround said first named flange and spaced therefrom, packing means in said space, a shoulder on the outer periphery of said second flange, anti-friction means supported by said shoulder, and a retaining ring surrounding said anti-friction means and fixed with relation to the fixed conduit.

5. In a swivel connection between a fixed pipe elbow and a rotatable pipe elbow, supporting means for said rotatable elbow, said supporting means comprising a pivotal support co-axial with the axis of the swivel connection, anti-friction means operative between the elbow and the pivotal support, and other anti-friction means to maintain the elbow in co-axial alignment with the support.

In testimony whereof, I affix my signature.

SIDNEY G. PLUMMER.